United States Patent [19]

Tobiki et al.

[11] 3,927,054

[45] Dec. 16, 1975

[54] PROCESS FOR PRODUCING β-PHENYLSERINE COPPER COMPLEX

[75] Inventors: Hisao Tobiki, Toyonaka; Tadashi Okamoto, Ashiya; Hisao Akiyama, Nishinomiya, all of Japan

[73] Assignee: Sumitomo Chemical Company, Ltd., Osaka, Japan

[22] Filed: Oct. 5, 1973

[21] Appl. No.: 403,906

[52] U.S. Cl. ............ 260/438.1; 260/470; 260/519
[51] Int. Cl.² ........................................ C07F 1/08
[58] Field of Search ................................ 260/438.1

[56] References Cited
UNITED STATES PATENTS

| | | | |
|---|---|---|---|
| 2,816,915 | 12/1957 | Gregory | 260/516 |
| 3,236,884 | 2/1966 | Geschickter et al. | 260/438.1 X |
| 3,733,352 | 5/1973 | Akiyama et al. | 260/470 |

OTHER PUBLICATIONS

Chemical Abstracts, Vol. 54, 13017i (1960).
Chemical Abstracts, Vol. 75, 152059n (1971).

*Primary Examiner*—Helen M. S. Sneed
*Attorney, Agent, or Firm*—Stevens, Davis, Miller & Mosher

[57] ABSTRACT

A novel process for producing DL-threo-β-p-methylsulfonylphenylserine derivatives, which are useful as intermediates for production of thiamphenicol, comprising reacting p-methylsulfonylbenzaldehyde with glycine copper complex in a suitable solvent under basic condition and esterifying the resulting DL-threo-β-p-methylsulfonylphenylserine copper complex with an alcohol.

4 Claims, No Drawings

PROCESS FOR PRODUCING β-PHENYLSERINE COPPER COMPLEX

This invention relates to a novel process for producing DL-threo-β-p-methylsulfonylphenylserine derivatives useful as intermediates for production of thiamphenicol. More particularly, the present invention relates to an improved process for producing DL-threo-β-p-methylsulfonylphenylserine copper complex and DL-threo-β-p-methylsulfonylphenylserine esters. Herein, the said ester means lower alkyl esters such as methyl and ethyl esters thereof.

The process of the present invention may be illustrated by the reaction scheme:

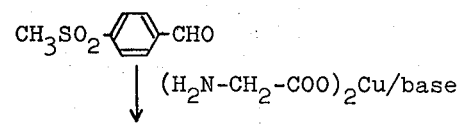

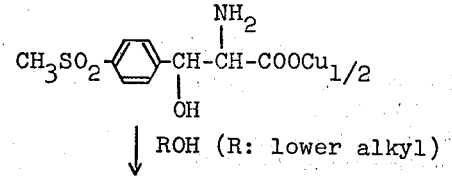

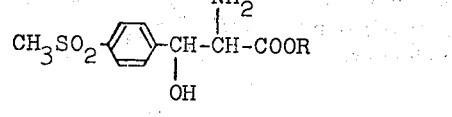

DL-Threo-β-p-methylsulfonylphenylserine copper complex and DL-threo-β-p-methylsulfonylphenylserine esters are useful as intermediates for production of thiamphenicol useful as an antibacterial agent.

DL-Threo-β-p-methylsulfonylphenylserine copper complex is esterified with an alcohol to form a DL-threo-β-p-methylsulfonylphenylserine ester. The DL-threo-β-p-methylsulfonylphenylserine ester is subjected to optical resolution with d-tartaric acid to form the D-form ester, which is then reduced and dichloroacetylated. Thus, thiamphenicol can be obtained in a high yield.

One embodiment of the preparation of thiamphenicol described above is represented by the following reaction scheme:

DL-Threo-β-p-methylsulfonyl-
phenylserine ester

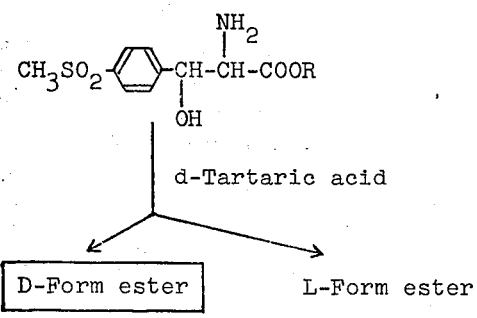

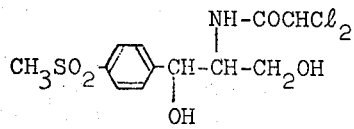

As a process for producing DL-threo-β-p-methylsulfonylphenylserine esters, U.S. Pat. No. 2,816,915 discloses a process which comprises reacting one mole of glycine with 1.73 moles of p-methylsulfonylbenzaldehyde in a mixed solvent of triethylamine and water and then subjecting the resulting product to separation and purification to yield DL-threo-β-p-methylsulfonylphenylserine and esterifying the DL-threo-β-p-methylsulfonylphenylserine. The U.S. patent process is not industrially advantageous in that the yield of the condensation product is low and very complex separation and purification must be carried out in order to remove the erythro form produced as a by-product.

The present inventors and co-workers previously studied a commercially advantageous process for producing DL-threo-β-p-methylsulfonylphenylserine, and as the result, developed a process for producing DL-threo-β-p-methylsulfonylphenylserine in a high yield and a high quality which comprises reacting two moles of p-methylsulfonylbenzaldehyde with one mole of an alkali metal salt of glycine in an alcoholic solvent in the presence of an alkali metal carbonate catalyst (U.S. Pat. No. 3,733,352).

The present inventors have studied a commercially more advantageous process for producing DL-threo-β-p-methylsulfonylphenylserine esters, and as the result, have found that DL-threo-β-p-methylsulfonylphenylserine copper complex can be produced in a high yield and a high quality by reacting p-methylsulfonylbenzaldehyde with glycine copper complex in a suitable solvent under basic condition and that a DL-threo-β-p-methylsulfonylphenylserine ester can be produced in a high yield and a high quality by esterifying the copper complex obtained above as such without decomposing it. The present invention has now been completed on the basis of this finding.

Accordingly, an object of the present invention is to provide an advantageous process for producing DL-threo-β-p-methylsulfonylphenylserine copper complex and DL-threo-β-p-methylsulfonylphenylserine esters, and other objects will be apparent from the following description.

In order to accomplish these objects of the present invention, the present invention provides a process for producing DL-threo-β-p-methylsulfonylphenylserine derivatives which comprises reacting p-methylsulfonylbenzaldehyde with glycine copper complex in a suitable solvent under basic condition to form DL-threo-β-p-methylsulfonylphenylserine copper complex and esterifying with an alcohol the DL-threo-β-p-methylsulfonylphenylserine copper complex to form a DL-threo-β-p-methylsulfonylphenylserine ester.

In the reaction for producing DL-threo-β-p-methylsulfonylphenylserine copper complex, water, a lower alcohol such as methanol, ethanol and propanol or a mixture of water and the lower alcohol may be used as a reaction solvent. The reaction temperature is preferably within a range between room temperature and 100°C, and the reaction may proceed at a higher temperature. However, temperatures exceeding 100°C are not preferable since part of the resulting DL-threo-β-p-methylsulfonylphenylserine copper complex may be decomposed at such temperatures.

It is necessary to make the reaction system alkaline with an alkali carbonate, an alkali hydroxide or ammonia and preferable pH values are within a range of 8–11. However, the reaction can be carried out at a higher pH. As for a molar ratio of the reactants, the reaction proceeds advantageously when an amount of glycine copper complex used is one mole or more per mole of p-methylsulfonylbenzaldehyde.

The glycine copper complex which is used as a starting material can be easily obtained by reacting glycine with a copper salt such as copper sulfate.

In the present invention, it is not necessary to isolate the thus obtained glycine copper complex. The copper complex may be reacted with p-methylsulfonylbenzaldehyde as such. Therefore, glycine may be first reacted with a copper salt and then p-methylsulfonylbenzaldehyde may be added to the reaction mixture. Alternatively, a mixture of glycine, a copper salt and p-methylsulfonylbenzaldehyde may be treated.

When a serine type compound is produced by the condensation of an aldehyde with glycine, an erythro isomer is generally formed as a by-product in addition to a threo form compound. According to the process of the present invention, however, the desired threo form compound can be selectively produced.

In the thin layer chromatography of the β-p-methylsulfonylphenylserine after the copper moiety has been removed from the product obtained by the condensation reaction, no spot of the erythro form compound is detected.

The esterification reaction is carried out by heating the DL-threo-β-p-methylsulfonylphenylserine copper complex in a lower alcohol in the presence of an acidic compound such as hydrogen chloride, sulfuric acid or p-toluenesulfonic acid or a chlorinating agent such as thionyl chloride, phosphorus trichloride or phosphoryl chloride. The reaction temperature and reaction time depend upon the acidic compound used. When hydrogen chloride or sulfuric acid is used as an acidic compound, the reaction temperature is usually higher than room temperature, but it is most desirable to carry out the reaction at the boiling point of the alcoholic solvent used. The reaction is usually completed in 1 to 10 hours.

After the reaction, the resulting copper salt is filtered off or the solvent is removed by distillation under reduced pressure without filtering the copper salt. Thereafter, the copper salt thus separated is dissolved in water and copper is removed with, for example, hydrogen sulfide as copper sulfide. The residue is then neutralized with, for example, ammonia water to obtain the ester compound in the form of crystals.

The following examples illustrate the process of the present invention, but the scope of the present invention is not limited to these examples.

EXAMPLE 1

Production of DL-threo-β-p-methylsulfonylphenylserine copper complex

A mixture of 15 g of glycine, 25 g of copper sulfate, 600 ml of water and 17 g of 28% ammonia water was stirred at room temperature for 30 minutes. 18.4 Grams of p-methylsulfonylbenzaldehyde was added and the resulting mixture was stirred at 70° to 75°C for 3 hours. The separated crystals were collected by filtration, washed with 300 ml of warm water, and dried to yield 20.3 g of DL-threo-β-p-methylsulfonylphenylserine copper complex, melting point 232°–235°C (decomposition).

| Elementary analysis (as $C_{10}H_{12}O_5NSCu_{1/2}$): | | |
|---|---|---|
| | Calculated (%) | Found (%) |
| C | 41.41 | 41.65 |
| H | 4.17 | 4.01 |
| N | 4.83 | 4.57 |
| S | 11.05 | 10.93 |
| Cu | 10.95 | 10.78 |

EXAMPLE 2

Production of DL-threo-β-p-methylsulfonylphenylserine copper complex

A mixture of 15 g of glycine, 25 g of copper sulfate, 18.4 g of p-methylsulfonylbenzaldehyde, 300 ml of water, 300 g of methanol and 18 g of 28% ammonia water was stirred at 50°–55°C for 15 hours, heated to 70°C and filtered. The collected crystals were washed with 300 ml of warm water and dried to obtain 19.8 g of DL-threo-β-p-methylsulfonylphenylserine copper complex, melting point 231°–233°C (decomposition).

EXAMPLE 3

Production of DL-threo-β-p-methylsulfonylphenylserine copper complex

A mixture of 11.25 g of glycine, 18.75 g of copper sulfate, 18.4 g of powdered p-methylsulfonylbenzaldehyde and 600 ml of water was adjusted to pH 9.3 with 28% ammonia water and stirred at 45° to 50°C for 30 hours. The separated crystals were collected by filtration, washed with water and dried to give the objective copper complex. Yield, 26.1 g.

EXAMPLE 4

Production of DL-threo-β-p-methylsulfonylphenylserine ethyl ester

A mixture of 15 g of glycine, 25 g of copper sulfate, 18.4 g of p-methylsulfonylbenzaldehyde, 600 ml of water and 17 g of 28% ammonia water was stirred at 45°C for 30 hours and at 70°C for one hour. The separated crystals were collected by filtration, washed with 300 ml of warm water and dried to yield 24.3 g of DL-threo-β-p-methylsulfonylphenylserine copper complex, melting point 232°–234°C (decomposition).

To 20 g of this copper complex was added 120 ml of ethanol. Dry hydrogen chloride gas was passed through to saturate the mixture. The resulting mixture was refluxed for 4 hours and then concentrated under reduced pressure. To the residue was added 200 ml of water to dissolve the residue. Hydrogen sulfide gas was passed through the solution and the separated copper sulfide was filtered off and washed with water. The filtrate was combined with the washings and neutralized with ammonia water while cooling with ice. The separated crystals were collected by filtration, washed with water and dried under reduced pressure to give the objective ester. Yield, 17.6 g, melting point 125°C.

EXAMPLE 5

Production of DL-threo-β-p-methylsulfonylphenylserine methyl ester

To 20 g of DL-threo-β-p-methylsulfonylphenylserine copper complex obtained in Example 1 was added 80 ml of methanol. Into the resulting mixture was poured 30 g of concentrated sulfuric acid and the mixture was refluxed for 4 hours and cooled to a temperature of 5°C or less. The separated crystals were collected by filtration and dissolved in water. Hydrogen sulfide was passed through the solution and the separated copper sulfide was filtered off and washed with water. The filtrate was combined with the washings and neutralized with ammonia water while cooling with ice. The separated crystals were collected by filtration and washed with water. Yield 17 g, melting point 122°C.

What is claimed is:

1. A process for producing DL-threo-β-p-methylsulfonylphenylserine copper complex which comprises
    reacting p-methylsulfonylbenzaldehyde with glycine copper complex in an amount of at least one mole of complex per mole of p-methylsulfonylbenzaldehyde under basic condition
    in the presence of a solvent selected from the group consisting of water, a lower alcohol or a mixed solvent of water and a lower alcohol
    at a temperature within a range between room temperature and 100° C.
2. A process according to claim 1, wherein the said lower alcohol is methanol, ethanol or isopropanol.
3. A process according to claim 1, wherein the reaction is carried out in the presence of an alkali carbonate or an alkali hydroxide or ammonia.
4. A process according to claim 1, wherein the reaction is carried out at pH 8–11.

* * * * *